United States Patent [19]
Culler

[11] 3,737,224
[45] June 5, 1973

[54] APPARATUS FOR CALCULATING EXPOSURE TIMES AND SUBTRACTIVE COLOR FILTRATION IN DARK ROOM PHOTOGRAPHY

[75] Inventor: J. Glenn Culler, Ann Arbor, Mich.

[73] Assignee: KMS Industries, Inc., Ann Arbor, Mich.

[22] Filed: July 30, 1971

[21] Appl. No.: 167,766

[52] U.S. Cl. ................................355/32, 235/64.7
[51] Int. Cl. ..........................G03b 27/32, G06c 3/00
[58] Field of Search ....................235/64.7; 355/32, 355/35

[56] References Cited
UNITED STATES PATENTS

| | | | |
|---|---|---|---|
| 2,721,032 | 10/1955 | Gresham | 235/64.7 |
| 2,960,267 | 11/1960 | McFarlane | 235/64.7 |
| 3,285,125 | 11/1966 | Mitchell | 235/64.7 |
| 3,443,868 | 5/1969 | Mitchell | 355/32 |

*Primary Examiner*—Stephen J. Tomsky
*Attorney*—Barnes, Kisselle, Raisch & Choate

[57] ABSTRACT

Apparatus for determining proper exposure times and subtractive color filtration in making color prints from color negative films comprises a calculator and a data converter. Color print paper is test exposed to light passing through the negative, a diffusion filter, and red, green, and blue double wedge shaped filters of graduated density in the calculator. When the paper is developed the faintest sharply defined cyan, magenta, and yellow image indicates the correct exposure time for its respective primary color and the correct exposure time for printing is that indicated by said cyan image.

The data converter has three rotatable discs, each with an index for one primary color settable relative to an adjacent exposure duration scale at the test print value. This causes another index on each disc to set at a correlated subtractive color filter density value on another scale. After the discs are moved together to eliminate neutral density, the filter pack combination is read from the subtractive indices.

13 Claims, 12 Drawing Figures

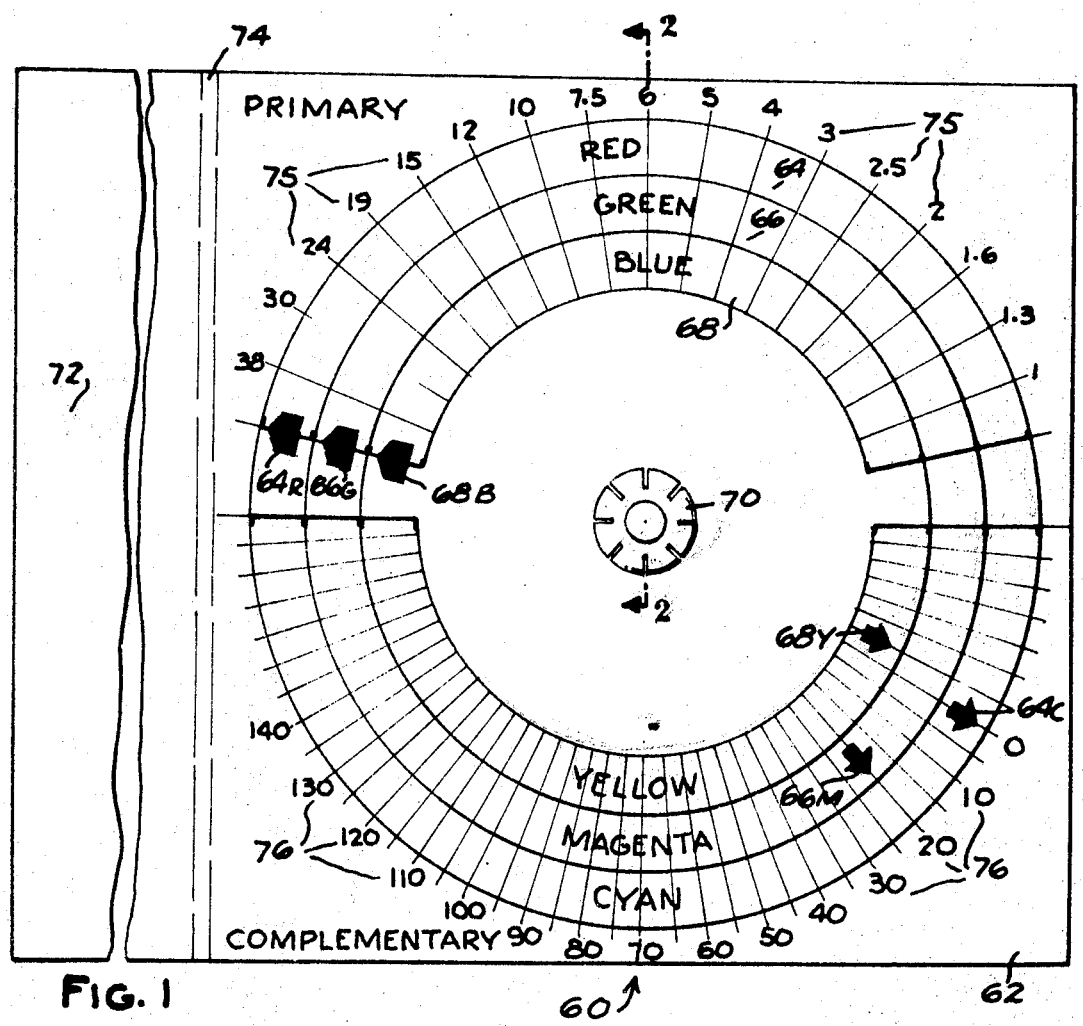
FIG. 1
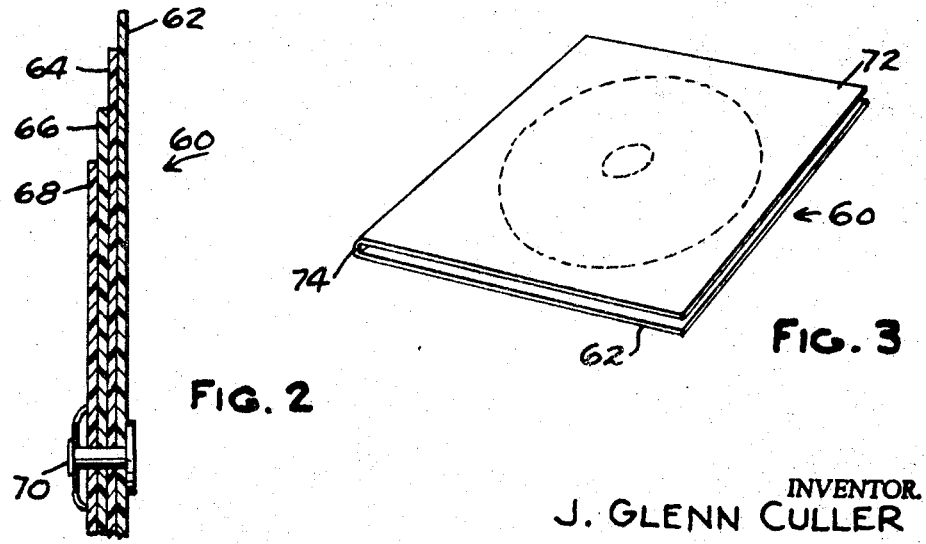
FIG. 2
FIG. 3
INVENTOR.
J. GLENN CULLER
ATTORNEYS

INVENTOR.
J. GLENN CULLER

BY
Barnes, Kisselle, Raisch & Choate

ATTORNEYS

3,737,224

APPARATUS FOR CALCULATING EXPOSURE TIMES AND SUBTRACTIVE COLOR FILTRATION IN DARK ROOM PHOTOGRAPHY

This invention relates to the art of making color photographic prints from color negatives. More particularly, the invention relates to apparatus for determining the correct exposure time and the composition of a subtractive color pack in a projector for producing in a color print an accurate reproduction of the image on the color negative.

It is very difficult even for those experienced in the art to accurately evaluate the color characteristics in an exposed and developed color negative film. There are numerous reasons for this. First, color negative films are subject to variations in manufacture which vary their responses to light. Second, there are variables in the developing of color negative films, such as time, temperature, agitation, and cleanliness which frequently and unpredictably effect changes in the color characteristics of the color negative imagery from that specified by the manufacturer even when the procedures recommended by the manufacturer are followed in the developing process.

Third, it is very difficult to visually evaluate color negative imagery due to the fact that the recorded colors in the negative are complementary to the color of the subject; i.e., a red object records as cyan, green records as magenta, and blue records as yellow. In addition, most color negative films contain an overall yellow-orange dye mask which has been added by the manufacturer to produce acceptable color prints.

Fourth, color negative films are capable of producing acceptable color prints when over-exposed up to about 1 ½ stops, but acceptable color prints are difficult to produce when the color negative film has been under-exposed. Fifth, the color print papers are in general subject to unpredictable variations in manufacture and development similar to the negative films.

There are expensive, complex, electronic systems available for evaluating color negative films and which facilitate applying the corrections necessary in the color printing process for obtaining acceptable color prints. However, such equipment is beyond the reach of all but relatively large commercial or industrial processing establishments. Without such equipment the conventional procedure for obtaining acceptable color prints is a sometimes lengthy, tedious trail-and-error series of exposures utilizing different exposure times in connection with different color filters followed by development of the color print paper to determine the results of the test exposures.

Copending patent application Ser. No. 10,789 filed Feb. 12, 1970 and entitled Exposure Calculator and Filter Device for Dark Room Color Photography discloses a very simple and inexpensive apparatus for determining the correct exposure times in the additive color printing process. In this process, the color print paper is exposed to red, green, and blue light in three individual successive exposures. However, prior to the present invention no simple inexpensive apparatus has been available for accurately determining the exposure time and filter pack composition in the subtractive color printing process. In the latter process, the color print paper is given a single exposure to light which has been corrected before it passes through the negative by means of one or more filters of the subtractive colors; namely, cyan, magenta, and yellow.

The object of the present invention is to provide an apparatus for accurately determining the correct exposure time and correct subtractive filter combination in the subtractive color printing process and which is, nevertheless, so inexpensive as to be within the financial means of the average photographic hobbyist.

In general, the invention contemplates the use of a calculator and a data converter. The calculator comprises an opaque member having three series of translucent windows therein, the windows having double wedge configuration. The series are provided respectively with red, green, and blue filters and the filters are graduated in density along each series. A test exposure is made through the filters and in the developed color print paper the faintest sharply defined cyan, magenta, and yellow image indicates the correct exposure time for its respective primary color; namely, red, green, and blue.

The data converter has three rotatable discs each with an index for one primary color, settable relative to an adjacent exposure time scale at the value taken from the test print. Setting of the primary color indices causes another index on each disc to set at a correlated, subtractive color filter density value on another scale. The discs are movable together to adjust to zero the index indicating the lowest filter density value to eliminate neutral density. The composition of the subtractive filter pack is that indicated by the remaining filter density indices. The correct exposure time for printing is that indicated by the selected cyan image on the test print.

One form of the invention is illustrated in the accompanying drawings.

FIG. 1 is a plan view of the data converter before it has been set.

FIG. 2 is a sectional view on line 2—2 of FIG. 1.

FIG. 3 is a perspective view on a smaller scale of the data converter in folded condition.

Figure 12:
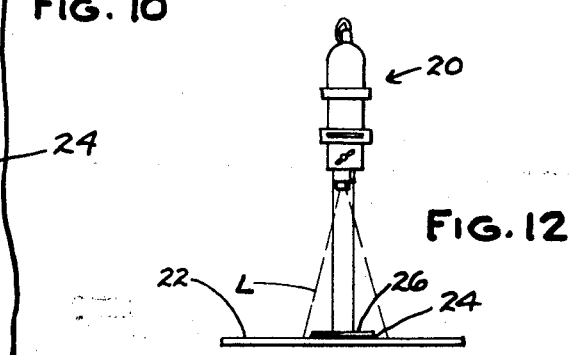
FIG. 12 is a partly diagrammatic elevational view of a light projector.

Shown in FIG. 12 is a conventional projector 20 positioned above a conventional easel 22 for supporting a sheet of color print paper 24 for exposure to light L which has passed through a color negative (not shown) in the projector. A calculator 26 according to this invention is positioned over paper 24 so that the light passes through the three series of filters therein.

Figure 4:
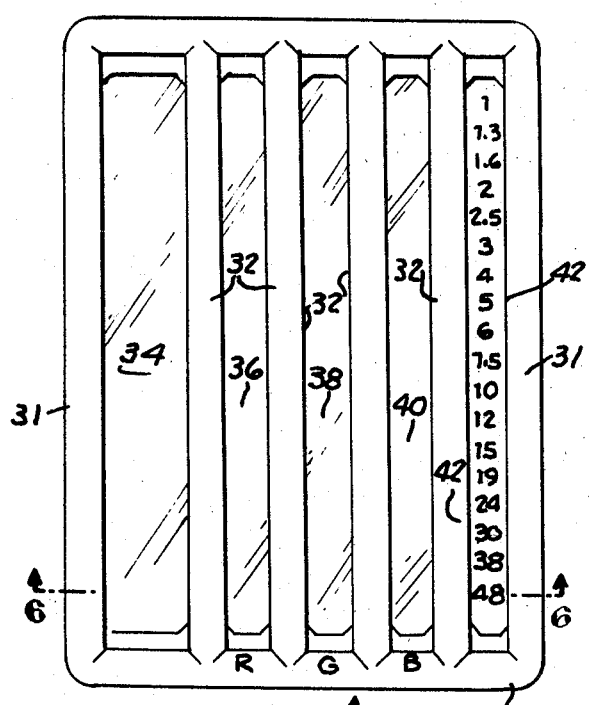
FIG. 4 is a plan view of the calculator.

Calculator 26 (FIG. 4) comprises a frame 28 and a filter plate 30 secured by suitable means such as adhesive to the underside of the frame. Frame 28 has sides 31 and a number of ribs 32 which cooperate to define a plurality of slot-like openings 34, 36, 38, 40, and 42.

Figure 7:
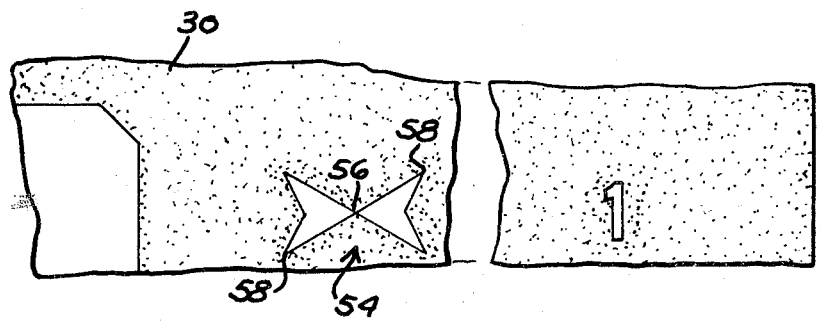
FIG. 7 is a fragmentary enlarged plan view of a portion of FIG. 5.

Filter paper 30 is substantially opaque except for translucent portions providing a window 44, a column of numerals 46 representing exposure times and three columns of series of windows 48, 50, and 52. Window series 48–52 and column 46 respectively underlie openings 36–42. Each window 54 (FIG. 7) has double wedge configuration with contiguous points 56 and points 58 remote therefrom.

Figure 5:
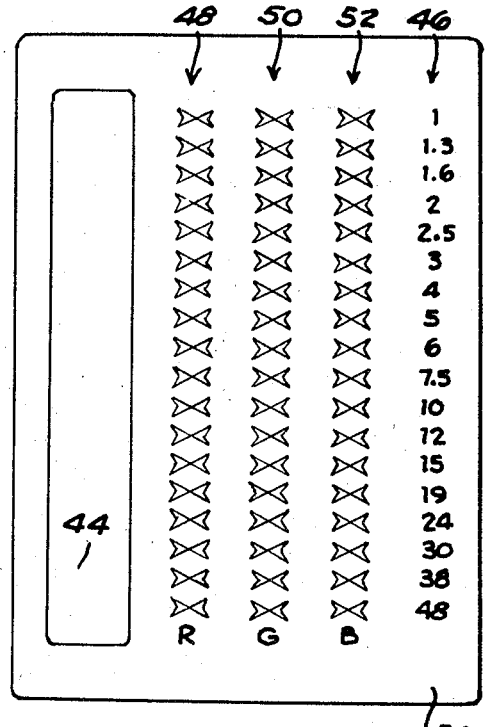
FIG. 5 is a plan view of the filter element in the calculator separate from its frame.
Figure 6:
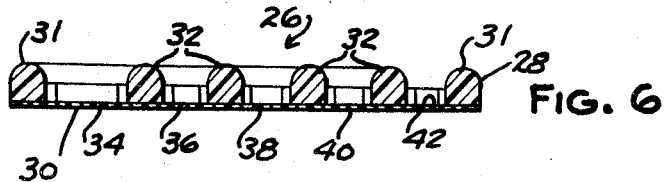
FIG. 6 is a sectional view on line 6—6 of FIG. 4.

The windows of column 48 contain a series of red filters which graduate in density from bottom to top as FIG. 5 is viewed, the windows at the top having the greatest density. Similarly, the windows of columns 50 and 52 have respectively green and blue filters of graduated density from bottom to top. The windows of the three colors are arranged laterally in groups of three, each group corresponding to an exposure time in seconds indicated in column 46.

Filter plate 30 can comprise a single exposed and developed photographic negative or can have laminar construction as is more fully described in the copending application identified above. The principle function of frame 28 is to hold filter plate 30 flat against color print paper 24 in use.

The data converter 60 illustrated in FIGS. 1–3 comprises a backing plate 62 upon which three discs 64, 66, and 68 are rotatably mounted in superposed relation means of a common pivot 70. The mounting plate and discs can be made of any relatively inexpensive material such as cardboard. A cover plate 72 may be hinged at 74 to backing plate 62 so that it can be folded over the discs for protection thereof while not in use (FIG. 3).

Disc 64 has relatively large diameter, discs 66 and 68 having successively smaller diameters. Backing plate 62 has a series 75 of numerals arranged arcuately adjacent the periphery of an upper portion (as FIG. 1 is viewed) of disc 64. These numerals represent exposure times and correspond to the exposure times of column 46 on filter plate 30. Discs 64, 66, and 68 are provided respectively with indices identified as 64R, 66G, and 68B to indicate their correspondence to the primary colors red, green, and blue. The discs can be turned independently of each other to align their respective indices with the numerals of exposure time scale.

Backing plate 62 is provided adjacent the lower peripheral portion of disc 64 with another arcuately arranged series 76 of numerals ranging from 0 to 140. These numerals represent the density values on the standard Density Transmittance Table of filters of the complementary or subtractive colors cyan, magenta, and yellow. The filtration value is obtained by placing a decimal to the left of two right hand digits. The filters themselves are commonly stocked items at photographic supply houses. The discs are provided respectively with indices identified as 64C, 66M, and 68Y to indicate their correspondence to the subtractive colors. The discs are provided with radial lines as shown to assist in accurate alignment of the two sets of indices with the two scales.

In use, a color negative from which prints are to be made is inserted in the projector. A diffusion filter (not shown) is mounted in the light path below the negative. With the dark room dark, a piece of color print paper 24 is placed emulsion-side up on easel 22 and calculator 26 is laid on the paper with filter plate 30 downward. The projector light is turned on and the paper is exposed typically for about 30 seconds at a predetermined diaphragm stop, typically f/8. The diffusion filter integrates the light emanating from the color negative and the integrated light passes through the filters in windows 54.

Figure 9:
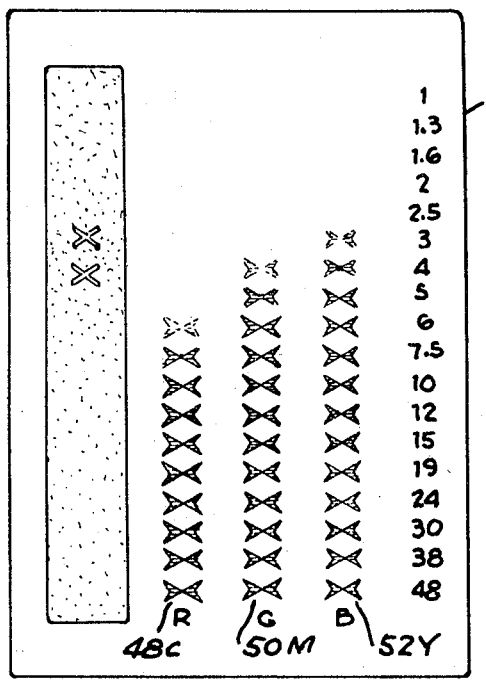
FIG. 9 is a plan view representing an exposed and developed test print.
Figure 10:
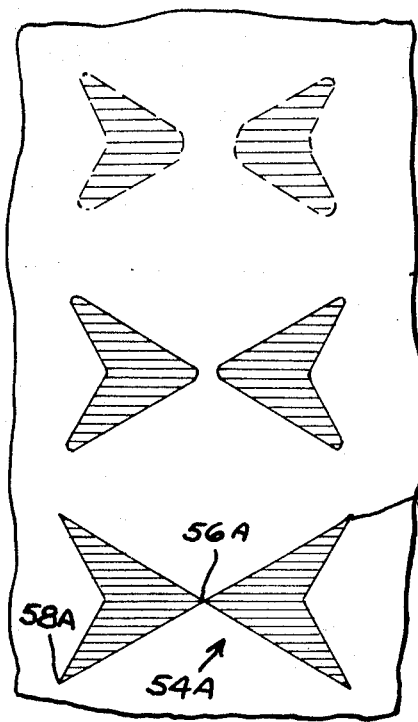
FIG. 10 is an enlarged fragmentary partly diagrammatic view of a portion of the test print.

When the test paper 24 is developed, it will bear a color image such as that represented in FIG. 9 including the column of exposure time numerals and three columns or series 48C, 50M, and 52Y of double wedge images 54A which have recorded respectively as cyan, magenta, and yellow. The densities of these images grow progressively fainter in an upward direction as FIG. 9 is viewed until the images begin to lose their definition at points 56A and 58A (FIG. 10).

In the example test print illustrated in FIG. 9, upon inspecting column 48C, it will be found that the faintest cyan image which is still sharply defined is that opposite numeral 10 which indicates that the correct exposure time for the primary color red is ten seconds. Similarly, inspection of columns 50M and 52Y will show that the correct exposure times for the primary colors green and blue respectively are six seconds and five seconds.

Figure 8:
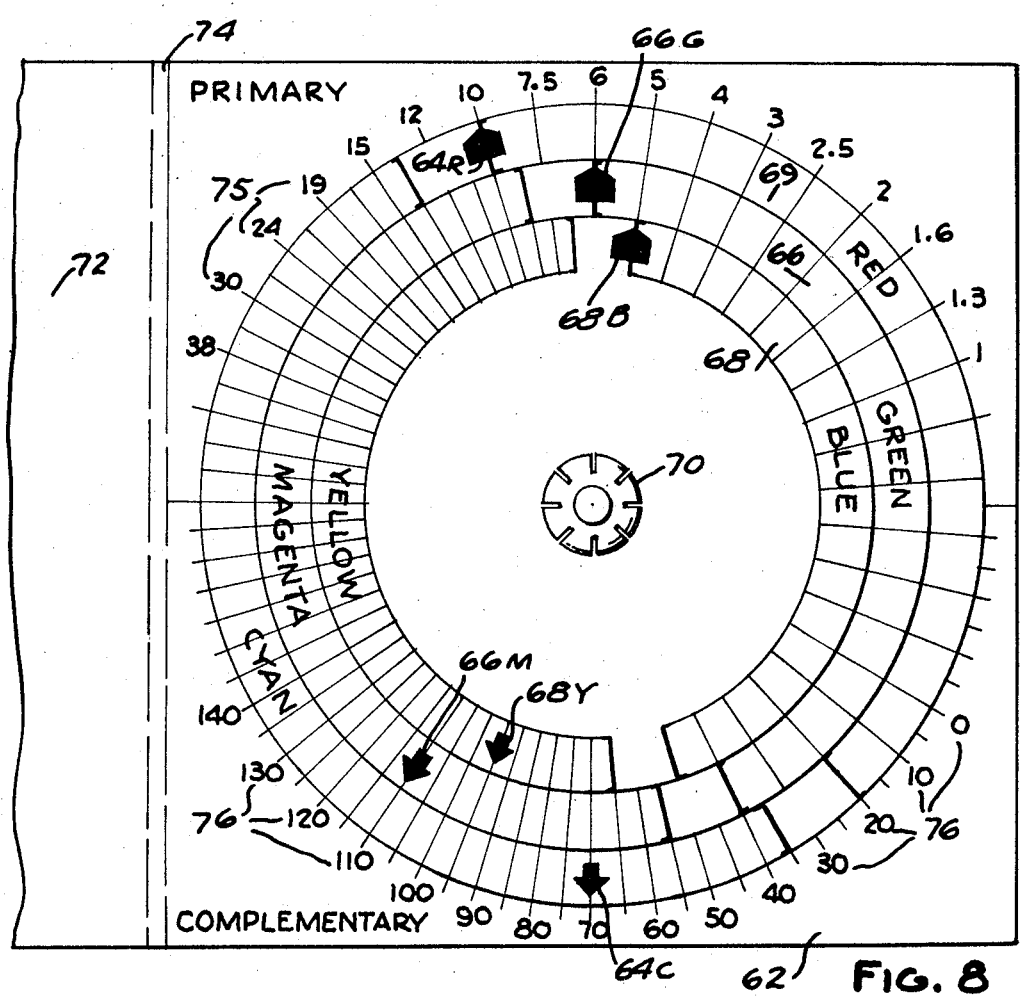
FIG. 8 is a view similar to FIG. 1, but illustrating the relation of the parts after an initial setting.

This data is now transferred to data converter 60. Discs 64, 66, and 68 are rotated so that their respective indices 64R, 66G, and 68B are set at ten seconds, six seconds, and five seconds on exposure time scale 75 as shown in FIG. 8. This causes their indices 64C, 66M, and 68Y to set respectively on 70, 110, and 95 on the subtractive color filtration scale 76.

Figure 11:
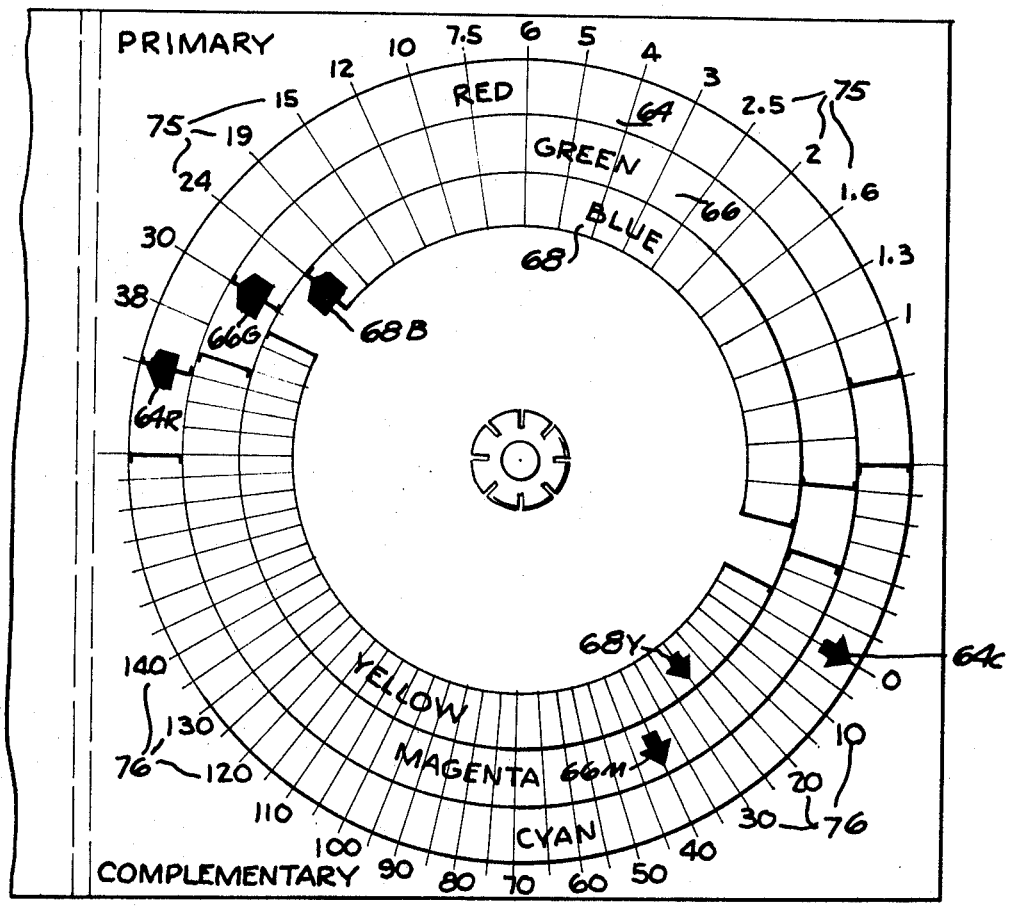
FIG. 11 is a view similar to FIG. 8 but illustrating the converter in a final setting.

These settings indicate the correct relation values of the subtractive color filters to be used for modifying the light from projector 20 to obtain accurate color images in prints made from the negative. However, a filter pack comprised of the subtractive filters indicated in FIG. 8 would have significant neutral density which would produce underexposed images on the color print paper. To eliminate this neutral density, discs 64, 66, and 68 are rotated together counterclockwise without disturbing their relative positions until the index set at the lowest density value becomes set at zero as shown in FIG. 11. In the example under consideration, that index is cyan index 64C.

The correct filter pack for use in projector 20 will have a magenta filter of the value .40 and a yellow filter of the value .25 as shown in FIG. 11. If two of the subtractive color indices should fall on zero in this final setting, the filter pack will comprise only one subtractive color filter; and if all three indices should fall on zero, then no filtration is necessary.

The filter pack indicated on scale 76, after the final setting, is inserted in the filter drawer (not shown) of projector 20. The correct exposure time for making prints with this filtration is that exposure time indicated by the test print for the primary color red; namely, ten seconds in the present example. With this filtration and exposure time, very accurate color prints are made.

Transparent portion 44 of filter plate 30 can be written upon to provide on the test print a record of any desired pertinent data, such as the date, type of paper, identification of negative, etc.

The densities of the filters in columns 48, 50, and 52 vary in a step by step manner from window to window. The step by step variation preferably produces variations in the densities of adjacent window images 54A on the test print which provide relatively fine control of the exposure time data transferred to converter 60.

Set forth below is a table showing the amount of step by step variation in the density values of the filters in a calculator found to give excellent results, these values being equivalent to the density values appearing in the standard Density Transmittance Table.

| Column 48 | Column 50 | Column 52 | Exposure Time |
|---|---|---|---|
| 1.17 | 0.88 | 0.94 | 1 |
| 1.06 | 0.80 | 0.87 | 1.3 |
| 0.97 | 0.73 | 0.80 | 1.6 |
| 0.91 | 0.67 | 0.73 | 2 |
| 0.84 | 0.61 | 0.67 | 2.5 |
| 0.77 | 0.53 | 0.61 | 3 |
| 0.70 | 0.46 | 0.53 | 4 |
| 0.65 | 0.39 | 0.45 | 5 |
| 0.57 | 0.32 | 0.39 | 6 |
| 0.49 | 0.27 | 0.32 | 7.5 |
| 0.42 | 0.21 | 0.26 | 10 |
| 0.35 | 0.17 | 0.21 | 12 |
| 0.29 | 0.14 | 0.17 | 15 |
| 0.24 | 0.11 | 0.13 | 19 |
| 0.19 | 0.09 | 0.11 | 24 |
| 0.16 | 0.08 | 0.09 | 30 |
| 0.12 | 0.07 | 0.07 | 38 |
| 0.10 | 0.06 | 0.06 | 48 |

By proper selection of the filters at windows 54, the entire scale of the above table of densities can be shifted to range as low as 0.02 or as high as 2.0.

It is to be understood that the equivalent of discs 64, 66, and 68 could be mounted for linear movement rather than circular movement and that scales 75, 76 could be arranged linearly adjacent thereto. Also, calculator 26 and converter 60 could be combined into one unit with exposure scales 46 and 75 serving both the calculator and the converter discs or their equivalent. The structure illustrated facilitates convenience both in manufacture and in use.

I claim:

1. Apparatus for calculating exposure times and subtractive color filtration for photographic emulsions which comprises,
   substantially opaque means having three series of windows therein provided respectively with red, green, and blue filters of graduated density,
   means providing an exposure duration scale with graduations correlated to the densities of said filters,
   means providing three indices representing respectively red, green, and blue and being movable respectively to positions corresponding to the graduations of said scale,
   means providing another scale with graduations indicating subtractive color filter densities corresponding to the graduations of said exposure duration scale,
   means providing three other indices representing respectively cyan, magenta, and yellow,
   said cyan, magenta, and yellow indices being movable responsive respectively to movement of said red, green, and blue indices to positions corresponding to the graduations of said other scale.

2. The apparatus defined in claim 1 wherein said other indices are movable together to adjust the neutral density represented by positions thereof relative to said other scale.

3. The apparatus defined in claim 1 wherein said other scale, said indices and indicia of said positions are provided on a common element relative to which said indices are movable.

4. The apparatus defined in claim 1 wherein said red and cyan indices are provided on a first common member, said green and magenta indices are provided on a second common member, and said blue and yellow indices are provided on a third common member.

5. The apparatus defined in claim 4 wherein said other scale, said indices and indicia of said positions are provided on a common element and said members are movably mounted thereon.

6. The apparatus defined in claim 5 wherein said members comprise circular discs rotatably mounted on said element by a common pivot.

7. The apparatus defined in claim 6 wherein said first member has relatively large diameter, said second member having a smaller diameter, said third member having diameter smaller than that of said second member.

8. The apparatus defined in claim 6 wherein said other scale and indicia of said positions are arcuately disposed around different circumferential portions of said first member.

9. The apparatus defined in claim 8 wherein the two indices on each member are provided at different circumferential locations thereon.

10. The apparatus defined in claim 5 wherein said members are movable together to adjust the neutral density represented by positions thereof relative to said other scale.

11. The apparatus defined in claim 6 wherein said members are movable together to adjust the neutral density represented by positions thereof relative to said other scale.

12. The apparatus defined in claim 1 wherein said series of windows are provided in a substantially opaque member, said two series of indices and said other scale being provided on another member, a said exposure duration scale being provided on each of said members respectively adjacent said windows and the first said three indices.

13. The apparatus defined in claim 12 wherein said series of windows and adjacent exposure duration scale are linearly arranged, said indices being arcuately movable and the exposure duration scale adjacent thereto being arranged arcuately.

* * * * *